June 26, 1934.   E. H. REMDE   1,964,273
INDUSTRIAL TRUCK
Filed July 1, 1931   9 Sheets-Sheet 1
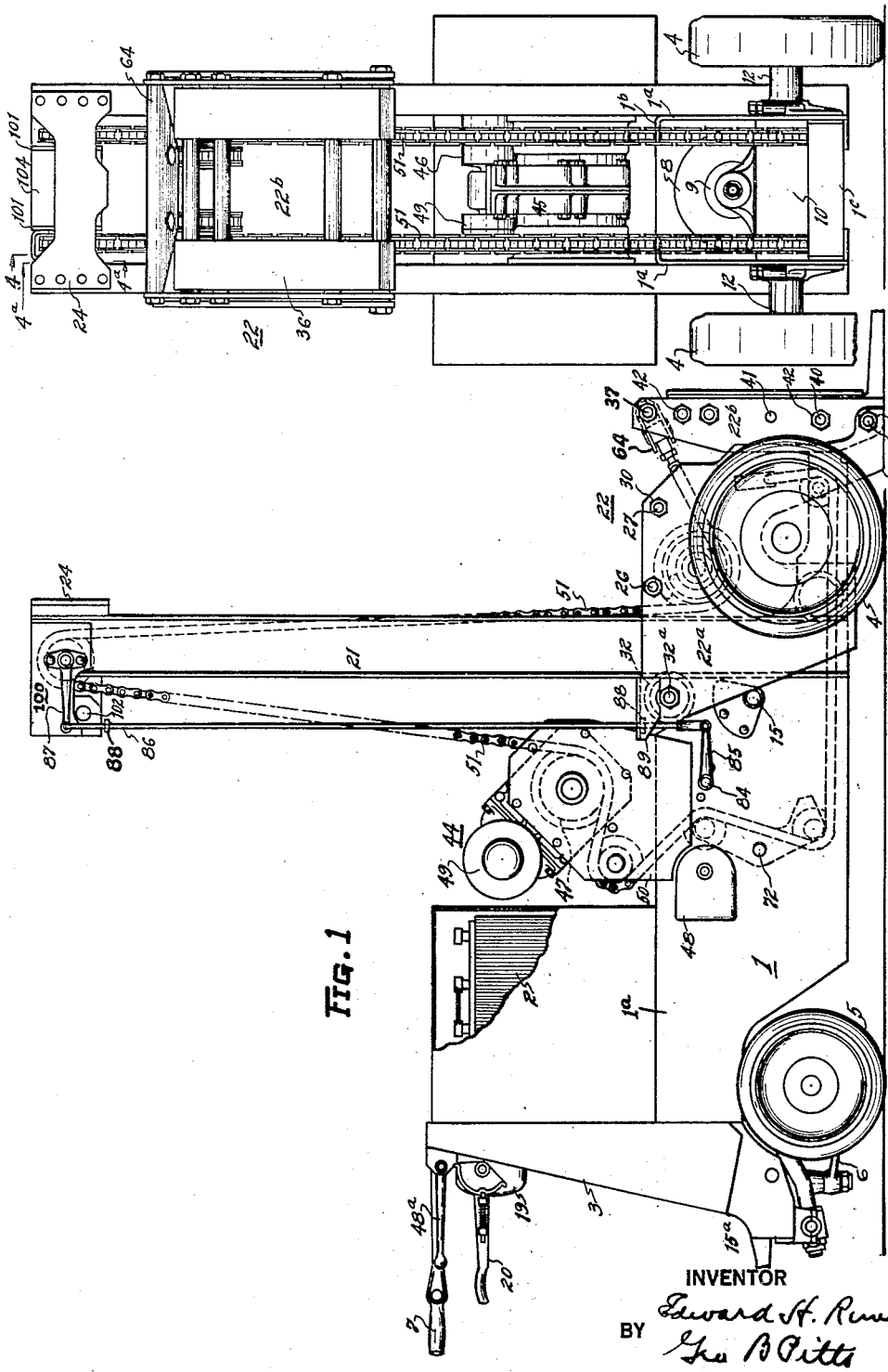
INVENTOR
Edward H. Remde
BY Geo B Pitts
ATTORNEY June 26, 1934.  E. H. REMDE  1,964,273
INDUSTRIAL TRUCK
Filed July 1, 1931  9 Sheets-Sheet 2

INVENTOR
Edward H. Remde
BY
Geo. B. Pitts
ATTORNEY

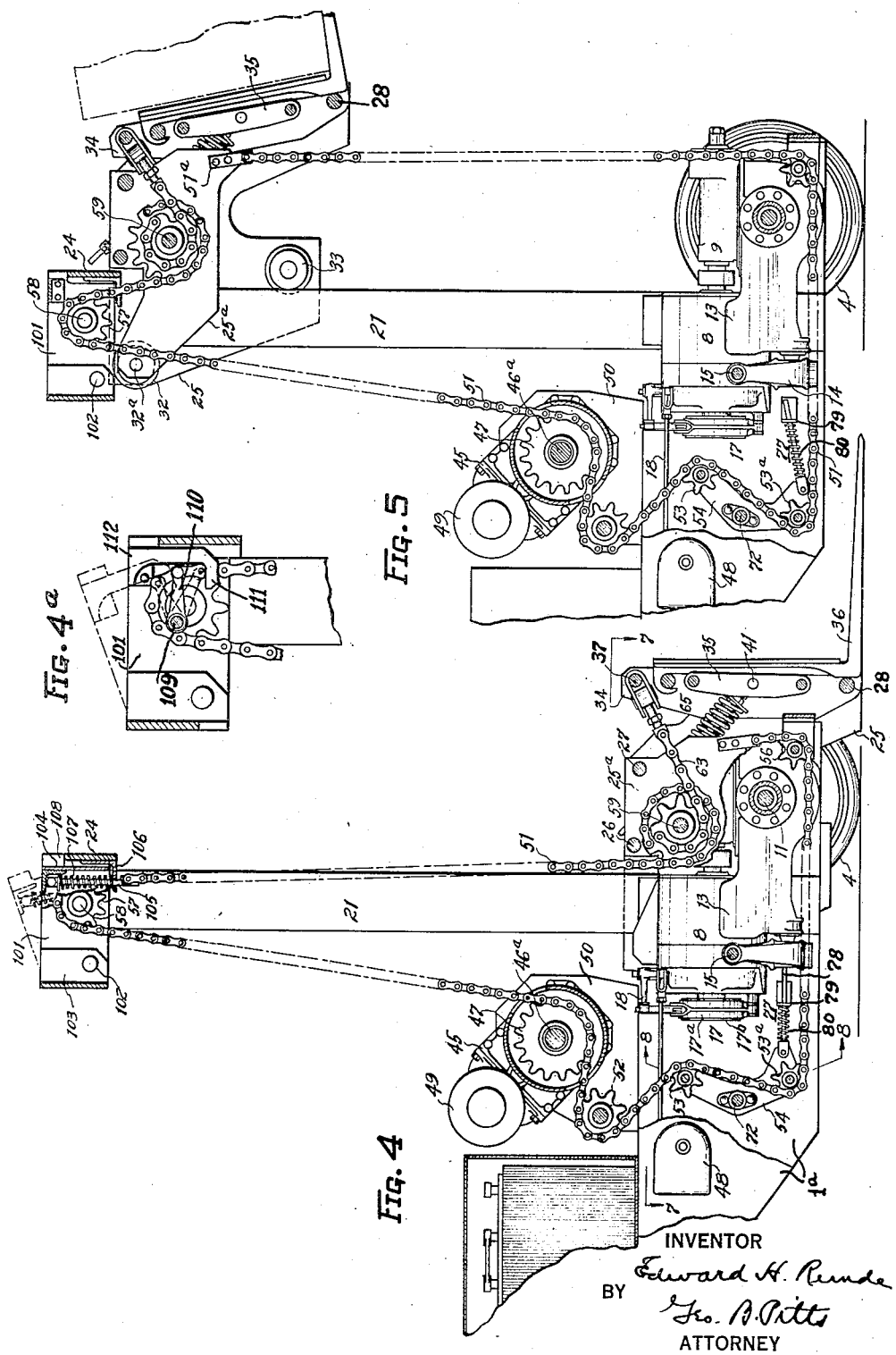

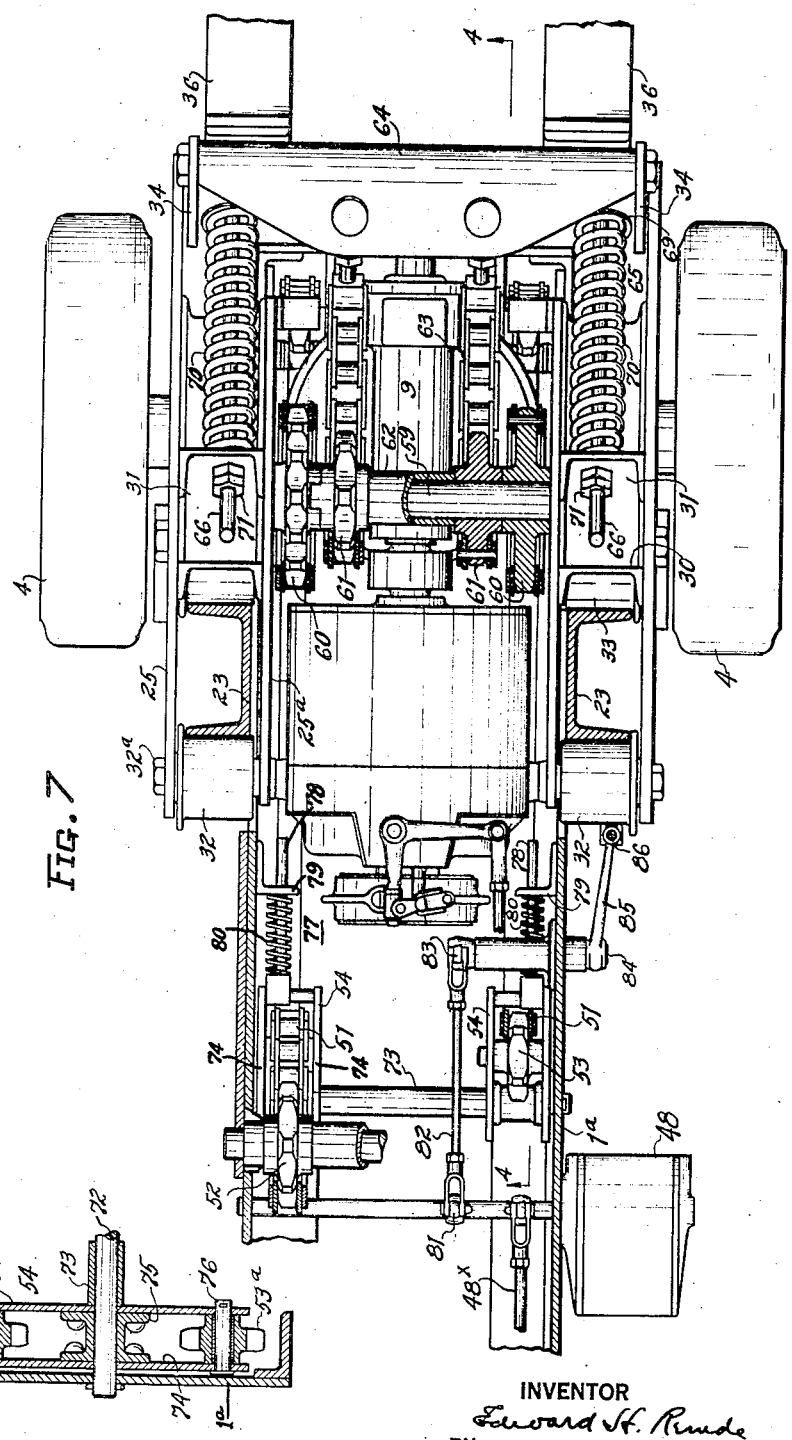

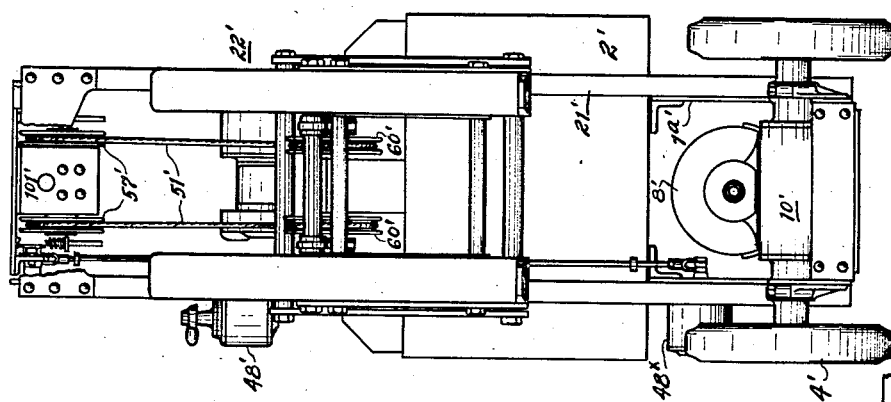
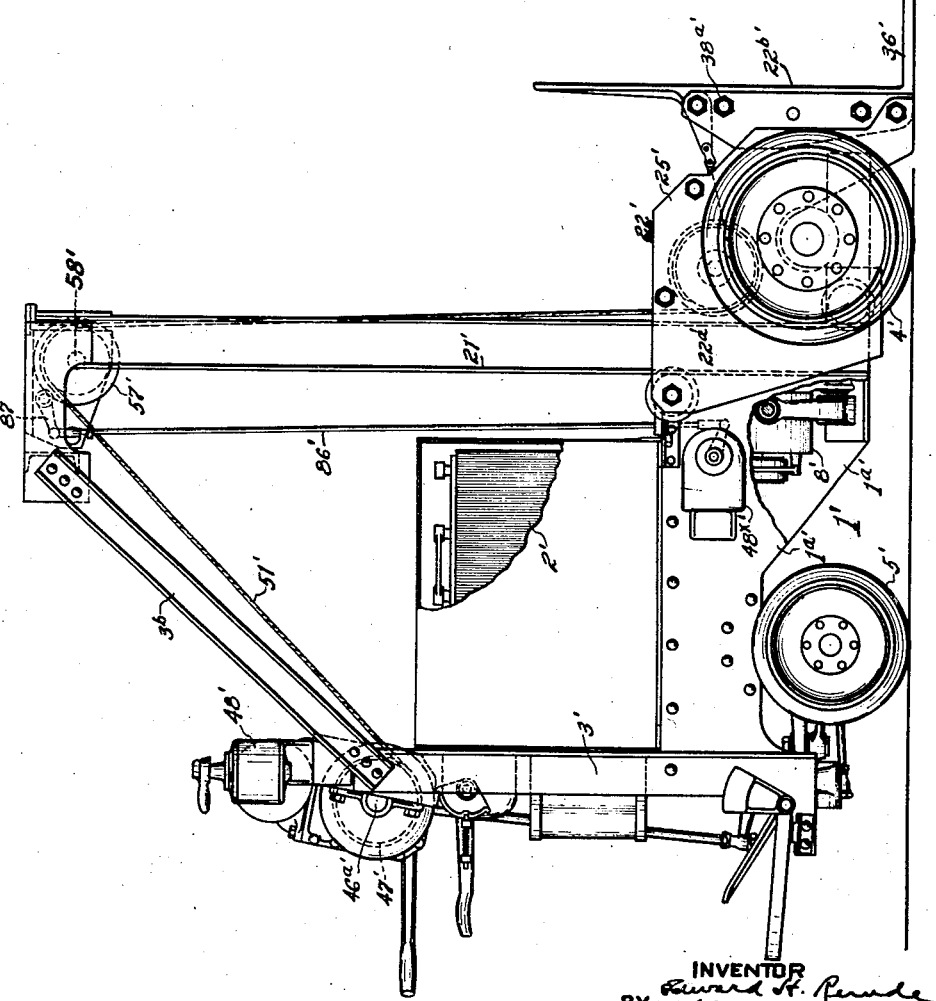

June 26, 1934.  E. H. REMDE  1,964,273
INDUSTRIAL TRUCK
Filed July 1, 1931  9 Sheets-Sheet 6

INVENTOR
Edward H. Remde
BY Geo. B. Pitts
ATTORNEY

June 26, 1934.    E. H. REMDE    1,964,273
INDUSTRIAL TRUCK
Filed July 1, 1931    9 Sheets-Sheet 7

INVENTOR
Edward H. Remde
BY
Geo. B. Pitt
ATTORNEY

June 26, 1934.  E. H. REMDE  1,964,273
INDUSTRIAL TRUCK
Filed July 1, 1931  9 Sheets-Sheet 8
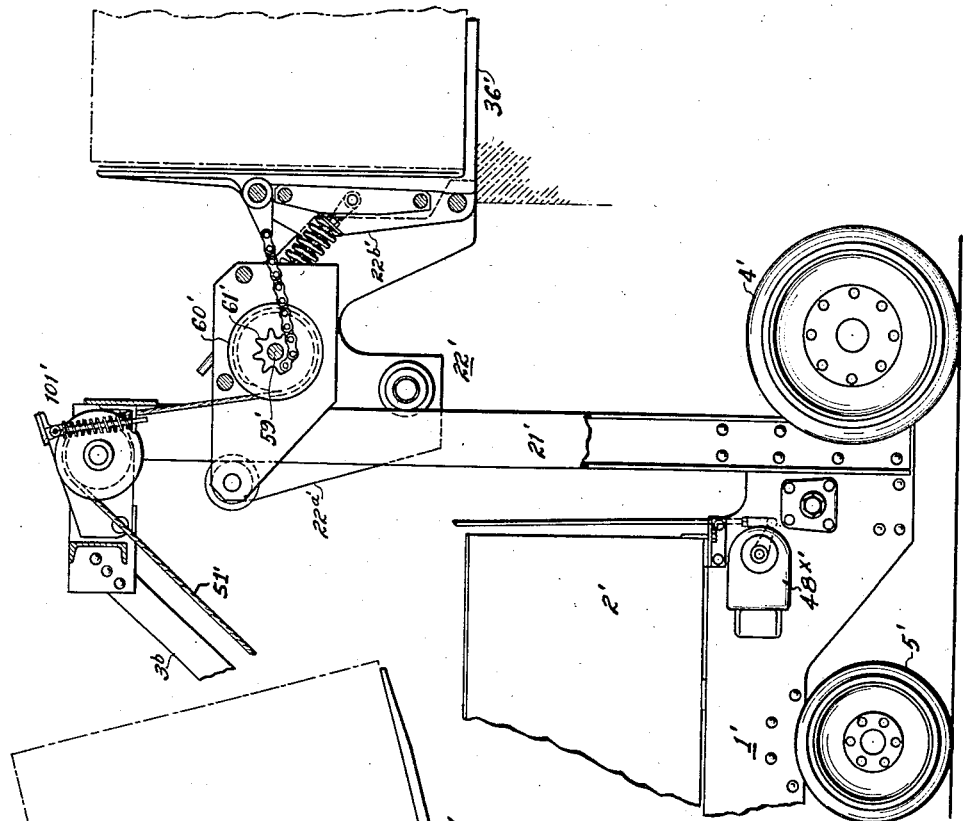
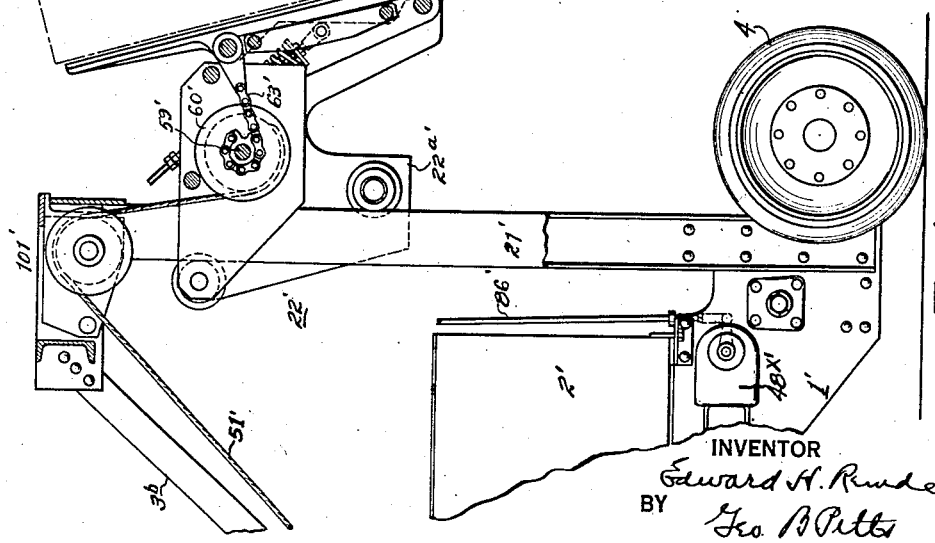
INVENTOR
Edward H. Remde
BY Geo. B Pitts
ATTORNEY

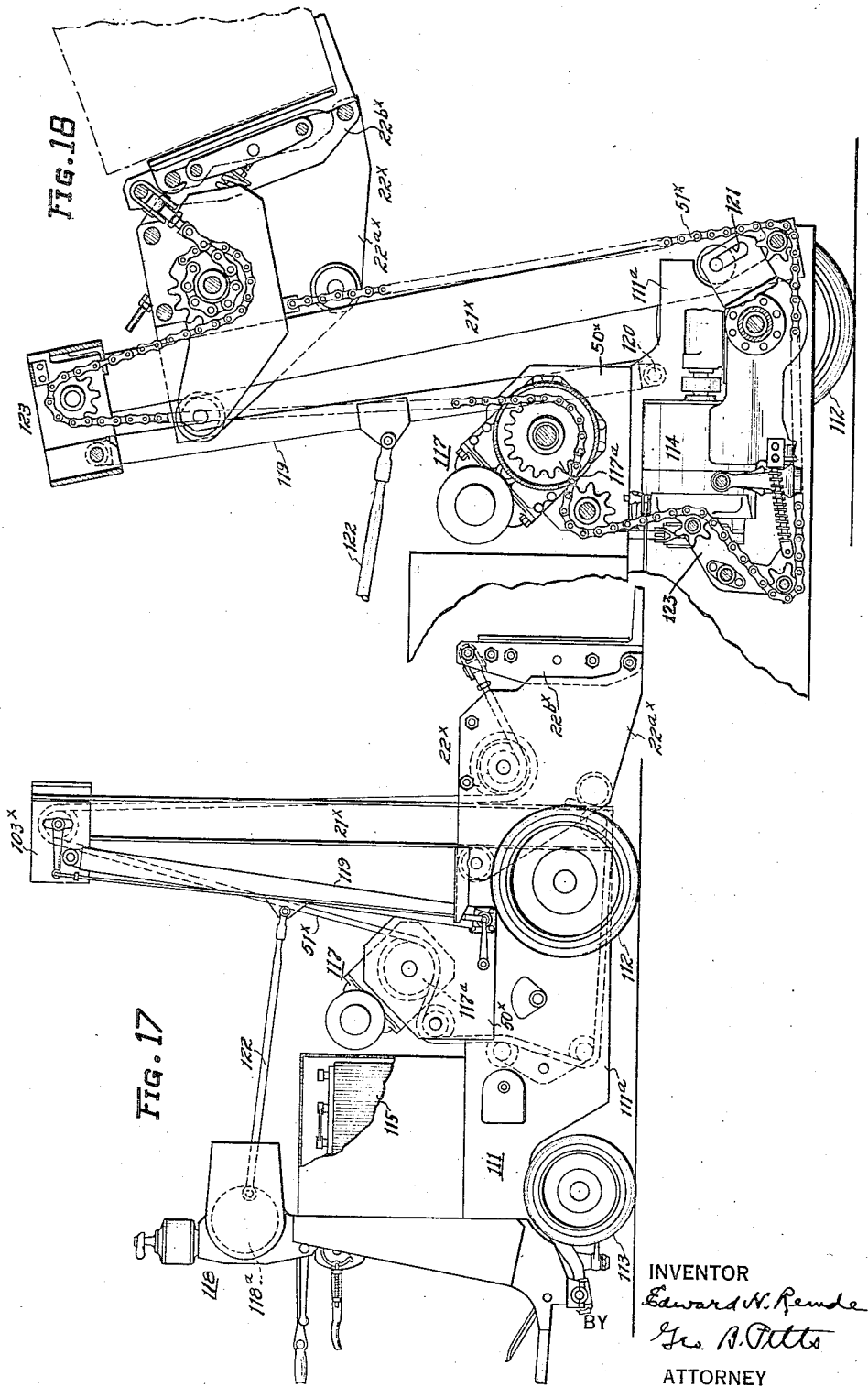

Patented June 26, 1934

1,964,273

UNITED STATES PATENT OFFICE 1,964,273

INDUSTRIAL TRUCK

Edward H. Remde, Cleveland, Ohio, assignor to The Baker-Raulang Company, Cleveland, Ohio, a corporation of Ohio Application July 1, 1931, Serial No. 548,129

19 Claims. (Cl. 187—9)

This invention relates to an industrial truck of the tiering type.

One object of the invention is to provide a truck of this type having an improved combined hoisting and tilting mechanism capable of tilting the load and elevating or lowering it.

Another object of the invention is to provide a truck of this type having an improved hoisting and tilting mechanism in which substantially endless flexible members are employed as the raising and lowering elements, and to combine therewith a compensating means for said members when a load is engaged and lifted.

Another object of the invention is to provide a truck of this type having an improved hoisting and tilting mechanism in which the flexible hoisting member or members operate through a differential connection with the load carrying member to tilt it when engaging a load.

Other objects of the invention will be apparent to those skilled in the art to which my invention relates from the following description taken in connection with the accompanying drawings, wherein Fig. 1 is a side elevation of a truck embodying my invention, parts being broken away.

Fig. 2 is a front elevation, showing the elevator raised.

Fig. 4 is a fragmentary section substantially on the line 4—4 of Fig. 2, but with the elevator in its lowest position.

Fig. 4a is a fragmentary section on the line 4a—4a of Fig. 2.

Fig. 5 is a view similar to Fig. 4, but showing the elevating member in raised position and the load carrier tilted, the position it occupies when loaded.

Fig. 7 is a fragmentary section substantially on the line 7—7 of Fig. 4.

Fig. 8 is a fragmentary section on the line 8—8 of Fig. 4.

Fig. 9 is a side elevation of a truck embodying my invention (parts being broken away) but having a slightly different form of construction.

Figs. 10 and 11 are front and plan views, respectively, of the truck shown in Fig. 9.

Fig. 15 is a fragmentary side elevation of the truck showing the position of the parts when the elevator is in an elevated position and carrying a load.

Fig. 16 is a view similar to Fig. 15, but showing the operation of picking up or discharging a load.

Figs. 17 and 18 are views substantially similar to Figs. 1 and 5, respectively, but showing another form of construction.

Figure 3:
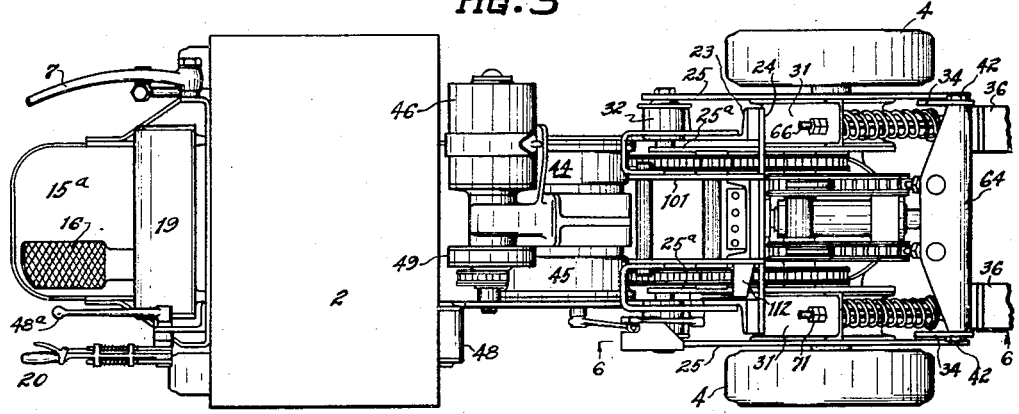
Fig. 3 is a plan view.

In the drawings, 1 indicates a frame consisting of two vertical side plates 1a rigidly connected in spaced relation by cross members, one being shown at 1c, and parts (hereinafter referred to) supported on and connected to the plates. The upper ends of the plates 1a terminate in flanges 1b on which the batteries 2 or other form of power supply means rest. 3 indicates upright members secured to the rear ends of the plates 1a.

4 indicates the traction wheels disposed at the front end of the frame 1. 5 indicates the steering wheels at the rear of the frame 1, these wheels being mounted on knuckles and operated through connections 6, by a lever 7. The plates 1a are cut away to accommodate the swinging movement of the wheels.

The traction wheels 4 are driven by a motor 8 having a propeller shaft within a casing 9 transmitting power through a power mechanism of the differential type, in a casing 10, to drive the axles 11 for the wheels 4. The side walls of the casing 10 are provided with tubular members 12 through which the axles 11 extend. The plates 1a are extended forwardly at their front ends, as shown at 1d, and supported on the axles 11. For this purpose, a casting 11a is provided with a semi-circular seat 11b to receive the adjacent tubular member 12, which is secured to its seat by a semi-circular block 11c (see Fig. 6). The free ends of the extensions are rigidly connected by the plate 1c (already referred to).

The sides and bottom of the casing 10 are extended inwardly to form a cradle 13 to which the motor 8 is rigidly connected. 14 indicates a torque member, substantially of U-shape, its opposite ends being trunnioned at 15 in the frame plates 1a and its intermediate portion being connected by a universal joint to the free end of the cradle 13. The construction of the torque member 14, its mounting and connection to the cradle are similar to like parts disclosed in U. S. Letters Patent No. 1,628,145, to which reference may be made.

15a indicates the operative's platform. 16 indicates a foot pedal for a brake 17. The brake comprises braking elements 17a adapted to engage a wheel 17b fixed to the shaft of the motor 8. The brake elements are connected through suitable connections 18 to the pedal 16, the elements 17a being normally biased into braking position by a spring not shown, so that by depressing the pedal 16, the brake 17 will be released, whereby the truck may be driven. The supply of current from the batteries 2 to the motor 8 is controlled by a controller within a casing 19, the controller being connected to and operated by a handle 20.

21 indicates a substantially vertical guide at the front end portion of the frame for an elevator indicated as an entirety at 22 and mounted to move upwardly and downwardly on the guide 21. The elevator 22 comprises a slidable or guided member 22a, which engages the guide and a load carrier 22b movably mounted on the slidable member 22a. The guide 21 may comprise a pair of spaced channel members 23, preferably mounted inwardly of the axles for the wheels 4. In the form of construction shown in Figs. 1 to 16, inclusive, each channel 23 is connected to the outer face of the adjacent plate 1a, preferably in a rigid manner, as by rivets. The upper ends of the channels 23 are connected by a cross piece 24.

The slide member 22a comprises pairs of parallel plates 25—25a, 25—25a, which are connected together by rods 26, 27 and 28. The rod 28 has reduced ends which extend through openings in the outer lower ends of the plates 25 and are threaded to take nuts 29, the nuts when tightened serving to secure the plates against the shoulders of the rods. The rods 26 and 27 extend through aligned openings formed in the plates 25—25a, 25—25a, and between the plates each rod is provided with sleeves, the plates and sleeves being rigidly clamped together by nuts 30 threaded on the ends of the rods and tightened against the plates 25. The plates of each pair are also rigidly connected by channel sections 30, 31. The slide member 22a is slidably mounted on the channel members 23 by a pair of upper rolls 32 and a pair of lower rolls 33. Each upper roll 32 rotates on a bushing between the adjacent plates 25, 25a, surrounding a bolt 32a extending through openings formed therein, the nut on the bolt being tightened and securing the plates in spaced relation against the ends of the bushing. Each lower roll 33 rotates on a stud shaft 33a mounted on and extending inwardly from the adjacent plate 25.

The load carrier comprises a pair of outer vertical plates 34 swingably mounted on the rod 28, a pair of inner vertical bars 35, suitable connections between the plates and bars, and load engaging elements 36. The plates 34 are connected in rigid spaced relation by a plurality of rods 37, 38, 39 and 40. For this purpose the ends of each rod are reduced to form shoulders and extend through openings formed in the plates 34, nuts 42 being provided on their ends and tightened against the plates 34 to secure them against the shoulders. The bars 35 are also rigidly spaced on the rods 39 and 40. For this purpose the bars rest against shoulders provided on these rods and between the bars 35 I provide spacing sleeves (see Fig. 6), so that when the nuts 42 for the rods 39 and 40 are tightened the bars are clamped in position.

The load engaging elements preferably comprise a pair of L-shaped devices, having at the upper ends of their vertical legs hooks 43 which removably and adjustably engage the rod 38, these legs depending from the rod and resting at their lower portions against the rod 28.

44 indicates as an entirety the means for raising and lowering the elevator and automatically tilting the load carrier thereof. Of these means, 45 indicates a housing enclosing a power mechanism, which is driven by an electric motor 46, receiving current from the batteries 2. The power mechanism includes suitable gear reductions for driving a shaft or shaft sections 46a to which are secured sprockets 47. The supply of current to the motor 46 is controlled by a controller 48 having connections 48x with an operating handle 48a. The shaft of the motor 46 is braked by a magnetic brake 49, which is connected in series with the motor, so that when current is supplied to the motor the brake is released and when the current is cut off, the brake is automatically applied. The construction and operation of the motor and its brake mechanism and the power mechanism are preferably similar to corresponding parts shown and described in my application Ser. No. 133,699, filed Sept. 4, 1926. The housing 45 is suitably secured at its ends to plates 50, which are mounted on and extend upwardly from the side plates 1a.

In the form of construction shown in Figs. 1 to 8, the hoisting elements comprise a pair of flexible sprocket chains 51 connected at one end, as hereinafter set forth, to the slide member 22a and load carrier 22b, whereby the load carrier may be tilted and it and the slide member raised and lowered. In this arrangement, the intermediate portion of each chain engages with and is driven by the adjacent sprocket 47; from one side of the sprocket 47 one end portion of the chain extends to and around a guide sprocket 52, then to and around a pair of sprockets 53, 53a, mounted on a rocker 54; from the latter sprockets, the chain extends to and around a guide sprocket 56, its free end being suitably connected at 51a to the adjacent inner plate 25a of the slide member 22a. From the other side of the sprocket 47 the other end portion of the chain 51 extends to and around a guide sprocket 57, which rotates on a shaft 58 supported at its opposite ends as hereinafter described at the upper ends of the guide channels 23; from the sprocket 57 the chain extends to and has connection with the load carrier 22b and slide member 22a in the following manner: 59 indicates a shaft supported at its opposite ends in the plates 25a, 25a. 60—61, 60—61, indicate pairs of sprockets loosely mounted on the shaft 59. The hubs of each pair of sprockets 60, 61, are connected together by male and female clutch elements (see Fig. 7), whereby they rotate together. The sprockets 61, 61, are spaced on the shaft 59 by a sleeve 62, which maintains the sprockets 60 in engagement with the plates 25a. The free end of each chain 51 is connected to one of the sprockets 60 and is arranged to wind thereon when the load carrier 22b swings or tilts outwardly as hereinafter set forth, and to unwind from the sprocket when pull is transmitted through the chain as later described.

Between the upper end of the load carrier 22b and the sprockets 61, 61, are chain sections 63, their outer ends being pivotally connected by means of a clevis or equivalent device between the legs of a U-plate 64 engaged over the rod 37. The inner end of each chain section 63 is connected to the adjacent sprocket 61 and is arranged to wind thereon when pull on the chains 51 takes place, the effect of which is to tilt the load carrier 22b inwardly as shown in Fig. 5 (when a load is mounted thereon), and to unwind therefrom when pull on the chains 51 is relieved to permit the load carrier 22b to swing or tilt outwardly to its normal position, as shown in Figs. 1, 3 and 4.

65 indicates a spring mechanism interposed between the slide member 22a and load carrier 22b, the purpose of which is to maintain the load carrier in its normal position when the elevator is being raised or lowered without a load, whereby the horizontal legs of the carrier will be in position to engage a load at all elevations. The spring mechanism 65 comprises two sets of devices, each consisting of the following parts: 66 indicates a rod having at its outer end a fitting 67 provided with a knuckle rotatably fitting a rod 41, which is supported at its ends by the bars 35. The inner end of the rod 66 extends through an opening formed in the adjacent channel section 31, the opening being enlarged to permit the rod to slide and swivel therein. Adjacent the fitting 67, the rod 66 is threaded to receive a nut 68 which adjustably supports a washer or collar 69. The collar 69 serves as an abutment for one end of an expansion spring 70 coiled around the rod 66 and engaging at its other end the channel section 31, the spring normally acting to swing the load carrier 22b to its normal position and being compressed when the load carrier is tilted inwardly. The outer end of the rod is threaded to take nuts 71, which operate as a stop to limit the outward swinging movement of the load carrier.

Figure 6:
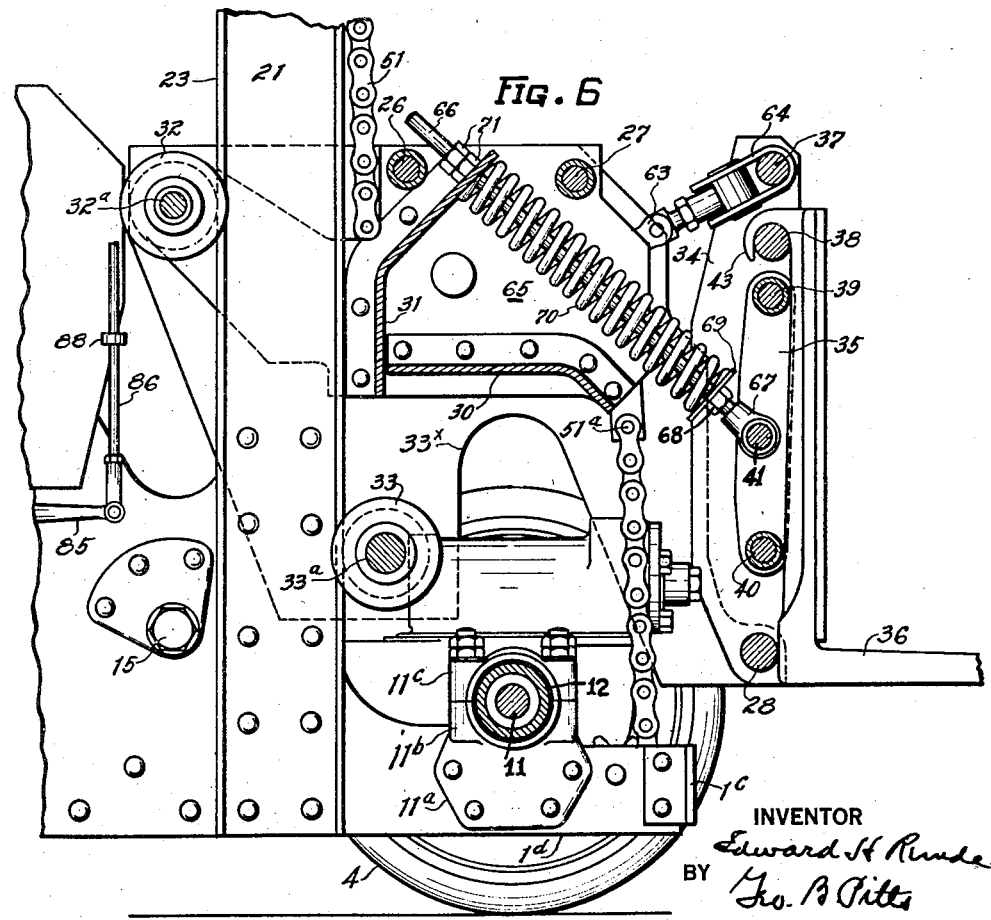
Fig. 6 is a fragmentary section, enlarged on the line 6—6 of Fig. 3.
Figure 11:
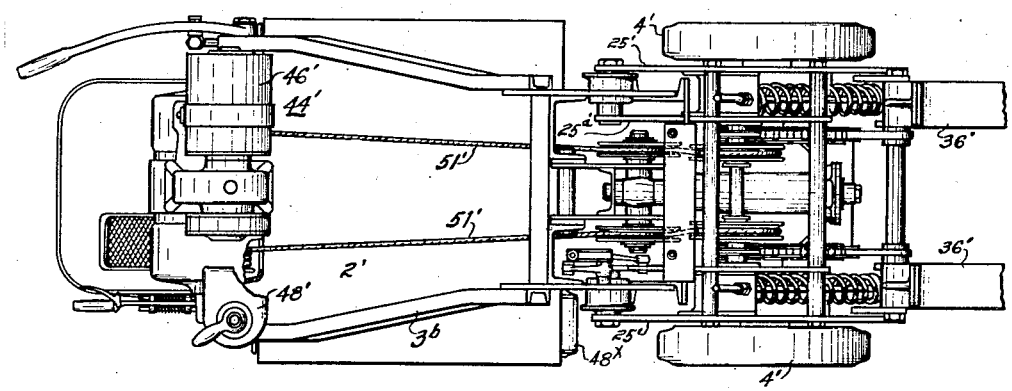
Figure 12:
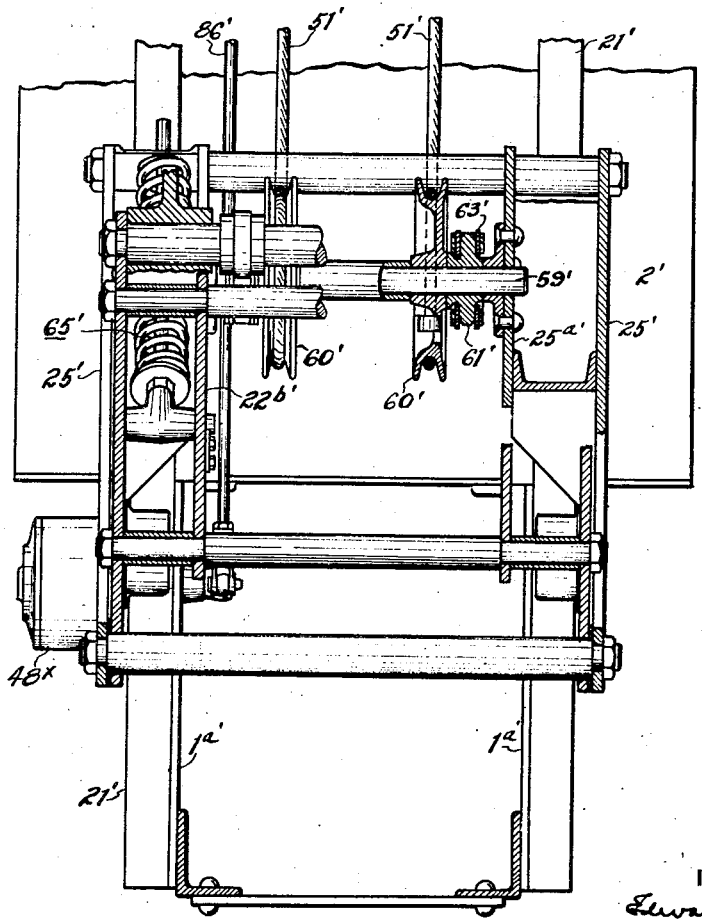
Fig. 12 is a fragmentary section on the line 12—12 of Fig. 14.
Figure 13:
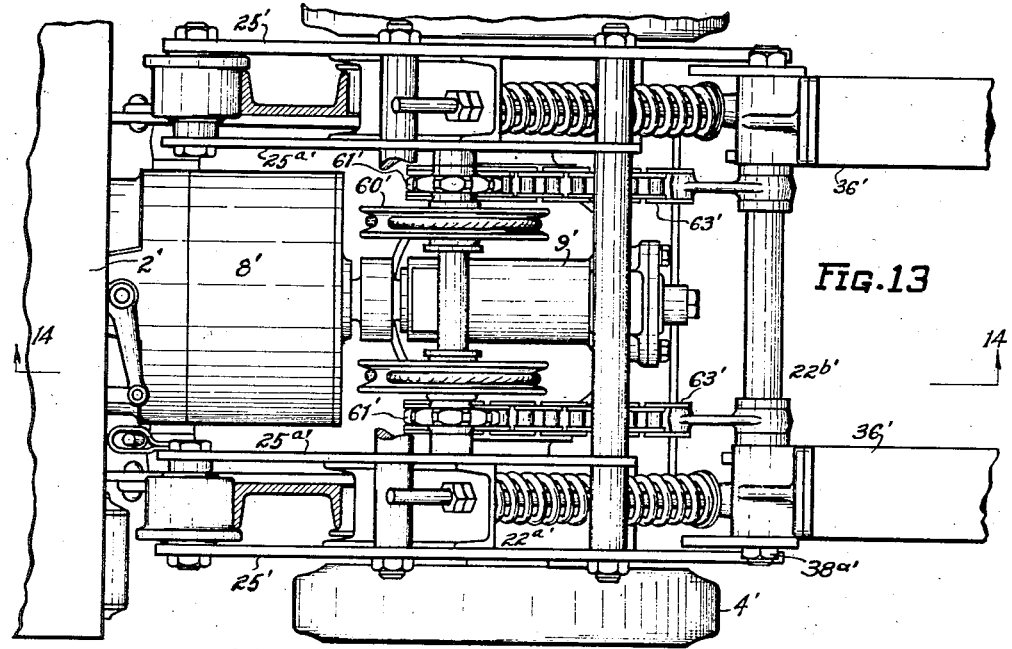
Fig. 13 is a section on the line 13—13 of Fig. 14.
Figure 14:
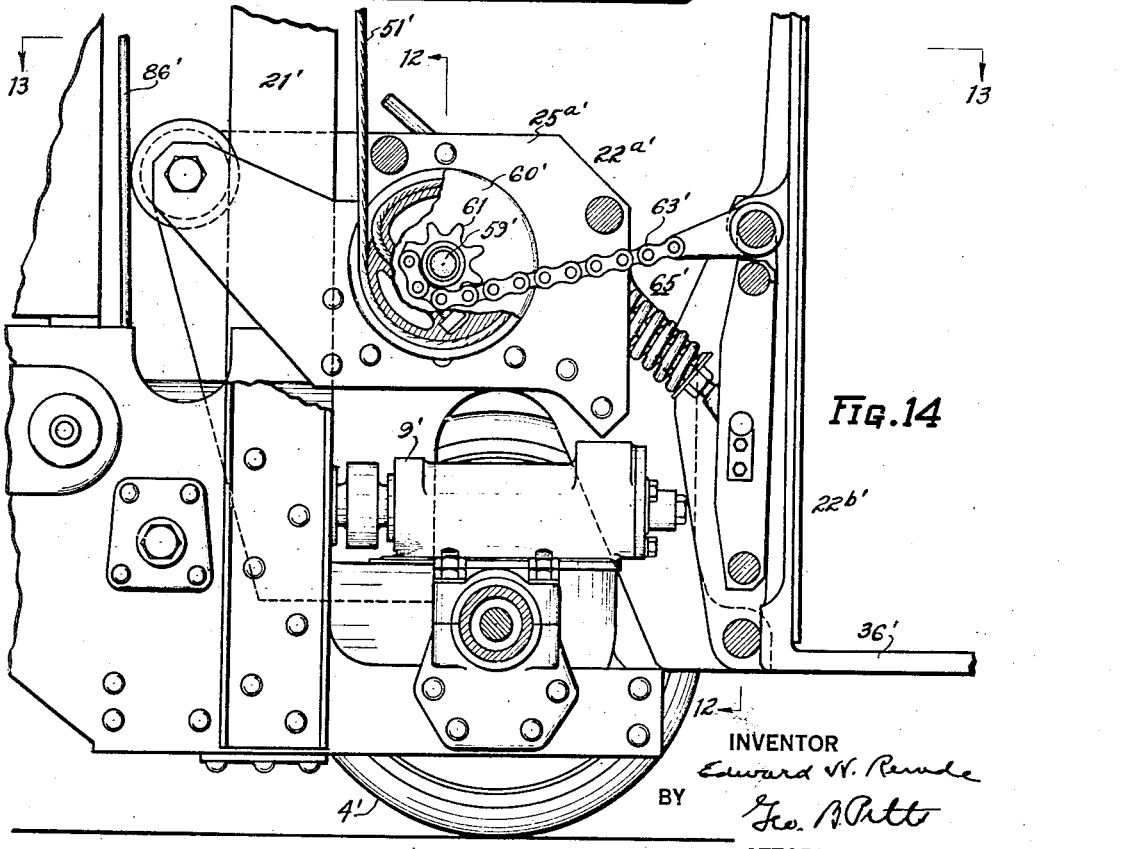
Fig. 14 is a section on the line 14—14 of Fig. 13.

The springs 70 of the mechanism 65 have sufficient tension to resist pull on the load carrier through the chain sections 63 when the chains 51 are driven to raise or lower the elevator 22, as shown in Fig. 6, but when the load engaging elements 36 are positioned below a load and the chains 51 are driven to lift the elevator and load, the pull of the chains to lift the increased weight overcomes the tension of the springs 70. Accordingly, when pull on the power transmitting portions of the chains takes place and the elements 36 are below a load, the chains first rotate the sprockets 60—61, 60—61, which winds the chain sections 63 on the sprockets 61 and tilts the load carrier 22b inwardly, effecting engagement of the nuts 42 on the rod 38 with the plates 25, which limit the inward movement of the carrier, and thereafter continued pull of the chains serves to raise the elevator and load as a unit. As the pull of the chains 51 is transmitted to the load carrier when supporting a load, the carrier remains in tilted position during lowering of the load until it or the slide member or carrier engages a support, whereupon the pull of the chains being relieved, the carrier is free to swing to its normal position under the influence of the weight of the load, aided by the spring mechanism 65.

It will be understood that the chains 51 could be guided around the sprockets 60 and their free ends connected to the load carrier 22b, but to reduce the strain on the power mechanism and chains, I provide a differential connection, consisting of pairs of different sized sprockets, the chains 51 being arranged to wind on and off the larger sprockets of the pairs thereof and the chain sections 63 being arranged to wind on and off the smaller sprockets of the pairs thereof.

To compensate for the length of the chains 51 unwound from the sprockets 60 during tilting of the carrier 22b, I provide a take-up mechanism for each chain and engaging therewith in its non-power transmitting portion, such mechanism including the rocker 54 and sprockets 53, 53a, already referred to. Each rocker 54 is trunnioned on a shaft 72 supported at its ends by the plates 1a. The rockers 54 are held in spaced position by a sleeve 73 surrounding the shaft. Each rocker comprises a pair of plates 74 secured to the opposite ends of a collar 75 which serves as a hub for the rocker (see Fig. 8). The sprockets 53, 53a, are mounted between the plates at opposite sides of the shaft 72 on shafts 76 which are supported at their ends by the plates. When the load carrier 22b is in normal position, each rocker is maintained in the position shown in Fig. 4, due to the adjacent chain 51 running around opposite sides of the sprockets 53, 53a, between the sprockets 52 and 56, in opposition to a spring mechanism 77, but when the chains 51 are driven to lift a load, those portions of the chains between the driven sprockets 47 and the connection 51a are lengthened, due to the unwinding of the chains from the sprockets 60, and permit the spring mechanisms 77 to operate the rockers 54. The result of this operation is to move the sprockets 53, 53a, away from the sprockets 52, 56, respectively, and thus take up the lengthening of the chains above referred to.

Each spring mechanism 77 comprises a rod 78 pivoted at one end to the rocker 54 and loosely guided in an opening formed in a bracket 79, which is fixed to the adjacent side plate 1a. Between a shoulder adjacent the pivoted end of the rod 78 and the bracket 79 is an expansion spring 80 coiled around the rod and normally tending to swing the rocker to move the sprockets 53, 53a, in the directions above set forth.

The operating shaft of the controller 48 carries an arm 81 connected by a link 82 to an arm 83. The arm 83 is fixed to a rock shaft 84 and the latter carries an arm 85 pivotally connected to a rod 86. The rod 86 extends upwardly substantially parallel to one of the guide channels, being supported at its upper end by an arm 87 pivoted on an adjacent portion of the guide channel. Near its upper and lower ends the rod 86 is provided with adjustable tappets 88. When the controller 48 is operated by the handle 48a, to raise or lower the elevator, the rod 86 is moved endwise in one direction, and upon the elevator reaching its limit of movement, an arm 89 thereon engages one of the tappets 88 and moves the rod 86 in the opposite direction, thereby operating the controller to neutral position and stopping the motor 46.

It will be noted that in the form of construction above described the guide 21 is mounted inwardly of the axle for the wheels 4 and that it extends downwardly to a point adjacent the floor; also that the plates 25 of the slide member 22a extend outwardly beyond the wheels 4 and support the carrier 22b therebeyond and in position to engage a load resting on dunnage or similar means on the floor. To provide for the lowering of the elevator to floor load-pick-up position, the plates 25 are cut away as shown at 33x so as to straddle the tubular members 12 and the plates 25a terminate at points above the cut aways (see Fig. 6). This form of construction is advantageous since the weight of the load is carried between the wheels 4 and 5 and danger of the truck frame tilting by reason of the load being supported outwardly of the front wheels is lessened, and I am enabled to use traction wheels of relatively large diameter and at the same time mount the load carrier 22b beyond the wheels for movement to the lowest desired position.

100 indicates as an entirety means for taking up slack in the chains 51 in the event the elevator engages an obstruction in its lowering movement or both chains break or run off any of their sprockets. Of these means, 101 indicates a pair of plates pivoted at their inner ends on a transverse shaft 102 and swingable upwardly (see dotted lines in Fig. 4). The shaft 102 is mounted on the inner legs of a pair of U-members 103, the outer legs thereof being secured to the channels 23. The shaft 58 is mounted at its ends in the plates 101 so as to swing upwardly therewith. The outer ends of the plates 101 are connected by a channel section 104. 105 indicates a plurality of rods (preferably four in number) each pivoted at their upper ends to an angle fixed to the inner face of the channel section 104 and depending downwardly and extending through openings formed in an angle 106, which is secured to the cross piece 24. The openings in the angle 106 are large enough to permit the rods 105 to slide and swivel therein. Between a shoulder on each rod 105 and the angle 106 is coiled an expansion spring 107, which normally tends to swing the plates 101 upwardly, so that any slack occurring in the chains 51 is taken up. The plates 101 are provided with shoulders 108, which engage the cross piece 24 to limit the downward movement of the plates 101 and thus support the shaft 58 in a predetermined normal position. No claim is made herein to the slack take-up mechanism as it forms the subject-matter of Letters Patent No. 1,904,984, dated April 18, 1933. The slack take-up mechanism is operatively connected to the arm 87, so that when undue slack occurs in the chains 51, the controller 48 is returned to neutral position. For this purpose, the arm 87 is connected to its shaft 109 and the inner end thereof carries an arm 110. The outer end of this arm is disposed in the path of movement of a hook or lug 111 on the lower end of a plate 112 having a flange secured to the adjacent plate 101, which lug when moved upwardly swings the arm 110 to its normal position, as shown in Fig. 4a.

In Figs. 9 to 16, I have shown a slightly different embodiment of my invention. In these views, the truck frame is indicated at 1' and consists of side plates 1a' supporting a battery 2' and upright members 3'. The frame 1' is mounted on traction wheels 4' and steerable wheels 5'. 21' indicates a vertical guide secured to the plates 1a' and braced by channels 3b connected to the upright members 3'. 22' indicates an elevator comprising a slide member 22a' and load carrier 22b', swingably mounted thereon as already set forth. The traction wheels are driven by a motor 8' through a power mechanism within a housing 10'.

The mechanism for raising and lowering the elevator and tilting the load carrier 22b' thereof is indicated at 44'. In this form of construction the motor 46' and power mechanism driven thereby are mounted between and at the upper ends of the upright members 3' and are similar in construction to the motor and power mechanism already referred to except that the driven shaft sections 46a' have secured to them drums 47' (instead of sprockets), on which cables 51' wind and unwind to raise and lower the elevator 22'. The cables extend from the drums 47' to and around guide sheaves 57' which rotate on a shaft 58' supported at the upper end of the guide 21'. From the sheaves 57' the cables extend to and are connected with sheaves 60', on which they wind and unwind, rotatable on a shaft 59'. The shaft 59' is supported at its ends by the plates 25a', 25a'. Each sheave 60' is rigidly connected to a sprocket 61' also rotatable on the shaft 59'. The sprocket has connected to it a chain section 63' which winds thereon and thereoff at one end, its opposite end being connected to the load carrier 22b'. 65' indicates a spring mechanism normally tending to swing the load carrier outwardly to its normal position. As already set forth, the spring mechanism 65' has sufficient tension to maintain the load carrier 22b' in normal position when the elevator is raised and lowered, but when the load engaging elements, indicated at 36' engage a load, the pull of the cables to overcome the increased weight, rotates the sheaves 60', which in turn effect a winding of the chain sections 63' on the sprockets 61', so that the carrier and load are tilted to the position shown in Fig. 15, the nuts $38a'$ engaging the plates 25' to limit the inward swinging movement; thereafter, the continued pull of the cables due to winding thereof on the drums 47' will raise the elevator and load while maintaining the latter tilted. Upon the lowering of the elevator into engagement with a support, the pull of the cables will be relieved, and thus permit the carrier to swing outwardly to normal position, as shown in Fig. 16, so that the load may be discharged by the backing away of the truck.

48' indicates the controller for controlling the supply of current to the motor 46' from the batteries 2'. $48x$ indicates a switch mechanism connected to a rod 86', which is operated by the elevator 22', when reaching its limit of movement in either direction, to cut off the current to the motor 46', as already set forth.

101' indicates as an entirety the slack take-up mechanism for taking up slack in the cables 51' when the elevator 22' engages an obstruction in its downward movement. Such mechanism is substantially similar to the mechanism already described. The slack take-up mechanism 101' may be connected to the arm 87' and actuate the switch mechanism $48x$ through the rod 86'. The connections between the slack take-up mechanism 101' and the arm 87' may be similar in construction to corresponding parts shown in my application Ser. No. 403,983, filed November 1, 1929.

In Figs. 17 and 18, I have shown a different embodiment of my invention wherein the load carrier, indicated at $22b^x$, may be tilted relative its slide member, indicated at $22a^x$, and the guide $21x$ for the latter may be tilted inwardly when desired.

This form of construction attains certain additional advantages; for example, it provides a construction in which the load may be tilted and also it and its elevator may be bodily moved inwardly to permit greater clearances of objects, especially in making turns; also, where an overload is being carried, the load may be moved inwardly relative to the front wheels.

In these views, the frame for the truck, indicated at 111, is supported on traction wheels 112 and steerable wheels 113, the wheels 112 being driven by a motor 114, which receives current from the batteries 115. 117 indicates as an entirety the power mechanism for driving a pair of chains $51x$, to raise and lower the elevator and tilt the load carrier. The power mechanism receives its power from the batteries 115. As shown, the chains $51x$ are operatively connected to the slide member $22a^x$ and differentially connected to the load carrier $22b^x$.

The parts above referred to are similar in construction to corresponding parts shown in Figs. 1 to 8, inclusive (so that further detail description thereof will not be necessary), except that the guide $21x$ is supported to swing inwardly and outwardly at its upper end by a power mechanism, indicated at 118, and when in its normal position, as shown in Fig. 17, it is disposed in a plane outwardly of the axles for the wheels 112. In this arrangement, I provide a pair of members 119, which are pivoted at their lower ends on pivots 120, supported on the outer sides of the plates 50x. The upper ends of the members 119 are pivotally connected to the members 103x of the guide 21x, so that when the members 119 are swung about their pivots 120, the guide is swung inwardly to the position shown in Fig. 18.

The channels constituting the guide 21x are slidably and pivotally connected at their lower ends to the frame side plates 111a, as indicated at 121, to permit of the guide to be operated by the members 119. The connection 121 is preferably similar to the connection shown and described in my co-pending application Ser. No. 336,963 (see Letters Patent No. 1,789,023, dated Jan. 13, 1931), so that a detail description thereof will not be necessary.

The power mechanism 118 receives its power supply from the batteries 115 and is similar in construction to the power mechanisms 117 and 44, except that instead of driving sprockets 117a (Figs. 17 and 18) or 47 (Figs. 4 and 5) it drives crank disks 118a, which are connected by pitmen 122 to the swingable members 119. By means of the power mechanism 118, crank disks 118a and pitmen 122, the guide 21x may be operated inwardly and outwardly in any position of the elevator 22x; also in any position of the guide, the elevator 22x may be raised or lowered.

123 indicates the mechanism for taking up slack in the chains 51x. This mechanism is similar to the mechanism shown in Figs. 1, 2, 3, 4, 4a and 5.

The embodiments of my invention herein disclosed may be advantageously used for transporting various kinds of loads, including sheet metal, since the load carrier may be tilted and thus so hold the load that danger of spilling thereof is materially reduced. From the foregoing description it will be seen that the tilting of the load carrier is automatically controlled and does not require any separate operation or attention by the operative.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In an industrial truck, the combination of a wheel mounted frame, a guide on said frame, a member slidable upwardly and downwardly on said guide, a carrier pivoted on said member to tilt inwardly, a rotatable member on said slidable member, a flexible member connected at one end to said slidable member, the opposite end of said flexible member being arranged to wind on and off said rotatable member, a driven element with which said flexible member engages intermediate its ends, power means for driving said driven element and operating therethrough and said flexible member to raise and lower said slidable member, the pull on said flexible member when operated to raise said slidable member serving to rotate said rotatable member, and means operated by said rotatable member for tilting said carrier relative to said slidable member.

2. In an industrial truck, the combination of a wheel mounted frame, a substantially vertical guide thereon, an elevator comprising a member slidable on said guide and a load carrier pivoted on said member to tilt inwardly and outwardly, a member rotatably mounted on said slide member, a flexible member connected at one end to said carrier and arranged to wind on said rotatable member to tilt said carrier inwardly when said rotatable member is operated in one direction, hoisting means including a flexible member having its outer end portion wound on said rotatable member and arranged when said means are operated in one direction to rotate said rotatable member in a direction to wind said first mentioned flexible member thereon, and means normally tending to tilt said carrier outwardly and arranged to prevent inward tilting thereof except when said carrier engages a load.

3. In an industrial truck, the combination of a wheel mounted frame, a substantially vertical guide thereon, an elevator comprising a member slidable on said guide and a load carrier pivoted on said member to tilt inwardly and outwardly, a member movable about an axis on said slide member, a device connected to said movable member and said load carrier and arranged to tilt it inwardly when operated in one direction, and hoisting means including a flexible member connected to said movable member and arranged when said means are operated to move said movable member in a direction to tilt said carrier, the connection of said flexible member with said movable member being on a longer radius from the axis of said movable member than the connection of said device thereto.

4. In an industrial truck, the combination of a wheel mounted frame, a substantially vertical guide thereon, an elevator comprising a member slidable on said guide and a load carrier pivoted on said member to tilt inwardly and outwardly, a member rotatably mounted on said slide member, a flexible member connected to said load carrier at one end and arranged to wind on and off said rotatable member, and hoist means including a flexible member arranged to wind on and off said rotatable member and arranged when said means are operated to unwind from said rotatable member and wind the other flexible member thereon, whereby said carrier is tilted inwardly.

5. In an industrial truck, the combination of a wheel mounted frame, a substantially vertical guide thereon, an elevator comprising a member slidable on said guide and a load carrier pivoted on said member to tilt inwardly and outwardly, a member rotatably mounted on said slide member, a flexible member connected to said load carrier at one end and arranged to wind on and off said rotatable member, and hoist means including a flexible member arranged to wind on and off said rotatable member and arranged when said means are operated to unwind from said rotatable member and wind the other flexible member thereon, whereby said carrier is tilted inwardly, the portions of said rotatable member on which said flexible members wind and unwind having different diameters.

6. In an industrial truck, the combination for a wheel mounted frame, a substantially vertical guide thereon, an elevator comprising a member slidable on said guide and a load carrier pivoted on said member to tilt inwardly and outwardly, a member rotatably mounted on said slide member, a flexible member connected to said load carrier at one end and arranged to wind on and off said rotatable member, hoist means including a flexible member arranged to wind on and off said rotatable member and arranged when said means are operated to unwind from said rotatable member and wind the other flexible member thereon, whereby said carrier is tilted inwardly, the portions of said rotatable member on which said flexible members wind and unwind having different diameters, and means normally tending to tilt said carrier outwardly and arranged to prevent inward tilting thereof except when said carrier engages a load.

7. In an industrial truck, the combination of a wheel mounted frame, a substantially vertical guide thereon, an elevator comprising a member slidable on said guide and a load carrier pivoted on said member to tilt inwardly and outwardly, a pair of sprockets connected together and rotatably mounted on said slide member, a chain connected to said carrier at one end and at its other end arranged to wind on and off one of said sprockets, a power mechanism, a sprocket driven by said mechanism, and a chain engaging said driven sprocket and arranged to wind on and off the other of said connected sprockets and operable when unwinding therefrom, due to operation of said power mechanism, to wind the other chain on its sprocket, whereby said carrier is tilted inwardly.

8. In an industrial truck, the combination of a wheel mounted frame, a substantially vertical guide thereon, an elevator comprising a member slidable on said guide and a load carrier pivoted on said member to tilt inwardly and outwardly, a pair of sprockets connected together and rotatably mounted on said slide member, a chain connected to said carrier at one end and at its other end arranged to wind on and off one of said sprockets, a power mechanism, a sprocket driven by said mechanism, and a chain engaging said driven sprocket and arranged to wind on and off the other of said connected sprockets and operable when unwinding therefrom, due to operation of said power mechanism, to wind the other chain on its sprocket, whereby said carrier is tilted inwardly, the said connected sprockets having different ratios relative to each other.

9. In an industrial truck, the combination of a wheel mounted frame, a substantially vertical guide thereon, an elevator comprising a member slidable on said guide and a load carrier pivoted on said member to tilt inwardly and outwardly, a pair of sprockets connected together and rotatably mounted on said slide member, a chain connected to said carrier at one end and at its other end arranged to wind on and off one of said sprockets, a power mechanism, a sprocket driven by said mechanism, a chain engaging said driven sprocket and arranged to wind on and off the other of said connected sprockets and operable when unwinding therefrom, due to operation of said power mechanism, to wind the other chain on its sprocket, whereby said carrier is tilted inwardly, the said connected sprockets having different ratios relative to each other, and means normally tending to tilt said carrier outwardly and arranged to prevent inward tilting thereof except when said carrier engages a load.

10. In an industrial truck, the combination of a wheel mounted frame, a substantially vertical guide thereon, an elevator comprising a member slidable on said guide and a load carrier pivoted on said member to tilt inwardly and outwardly, a pair of sprockets connected together and rotatably mounted on said slide member, a chain connected to said carrier at one end and at its other end arranged to wind on and off one of said sprockets, a power mechanism, a sprocket driven by said mechanism, a chain engaging said driven sprocket and arranged to wind on and off the other of said connected sprockets and operable when unwinding therefrom, due to operation of said power mechanism, to wind the other chain on its sprocket, whereby said carrier is tilted inwardly, and means for supporting the non-power transmitting portion of said chain.

11. In an industrial truck, the combination of a wheel mounted frame, a substantially vertical guide thereon, an elevator comprising a member slidable on said guide and a load carrier pivoted on said member to tilt inwardly and outwardly, a pair of sprockets connected together and rotatably mounted on said slide member, a chain connected to said carrier at one end and adapted to wind on and off one of said sprockets, a power mechanism, a sprocket driven by said mechanism, and a chain having its intermediate portion in engaging relation with said driven sprocket, one end portion of said last mentioned chain being arranged to wind on and off the other of said connected sprockets and operable when unwinding therefrom, due to operation of said power mechanism, to wind the other chain on its sprocket, whereby said carrier is tilted inwardly, and the other end portion of the last mentioned chain being connected to said slide member.

12. In an industrial truck, the combination of a wheel mounted frame, a substantially vertical guide thereon, an elevator comprising a member slidable on said guide and a load carrier pivoted on said member to tilt inwardly and outwardly, a pair of sprockets connected together and rotatably mounted on said slide member, a chain connected to said carrier at one end and adapted to wind on and off one of said sprockets, a power mechanism, a sprocket driven by said mechanism, a chain having its intermediate portion engaging said driven sprocket, one end portion of said last mentioned chain being arranged to wind on and off the other of said connected sprockets and operable when unwinding therefrom, due to operation of said power mechanism, to wind the other chain on its sprocket, whereby said carrier is tilted inwardly, and the other end portion of the last mentioned chain being connected to said slide member, and means normally tending to tilt said carrier outwardly and arranged to prevent inward tilting thereof except when said carrier engages a load.

13. In an industrial truck, the combination of a wheel mounted frame, a substantially vertical guide thereon, an elevator comprising a member slidable on said guide and a load carrier pivoted on said member to tilt inwardly and outwardly, a pair of sprockets connected together and rotatably mounted on said slide member, a chain connected to said carrier at one end and adapted to wind on and off one of said sprockets, a power mechanism, a sprocket driven by said mechanism, a chain having its intermediate portion engaging said driven sprocket, one end portion of said last mentioned chain being arranged to wind on and off the other of said connected sprockets and operable when unwinding therefrom, due to operation of said power mechanism, to wind the other chain on its sprocket, whereby said carrier is tilted inwardly, and the other end portion of the last mentioned chain being connected to said slide member, and means engaging the last mentioned chain between said driven sprocket and its connection with said slide member to compensate for the portion of the chain which unwinds from the last mentioned connected sprocket.

14. In an industrial truck, the combination of a wheel mounted frame, a substantially vertical guide thereon, an elevator comprising a member slidable on said guide and a load carrier pivoted on said member to tilt inwardly and outwardly, a pair of sprockets connected together and rotatably mounted on said slide member, a chain connected to said carrier at one end and adapted to wind on and off one of said sprockets, a power mechanism, a sprocket driven by said mechanism, a chain having its intermediate portion engaging said driven sprocket, one end portion of said last mentioned chain being arranged to wind on and off the other of said connected sprockets and operable when unwinding therefrom, due to operation of said power mechanism, to wind the other chain on its sprocket, whereby said carrier is tilted inwardly, and the other end portion of the last mentioned chain being connected to said slide member, and means engaging the last mentioned chain between said driven sprocket and its connection with said slide member to compensate for the portion of the chain which unwinds from the last mentioned connected sprocket, said compensating means comprising a rocker carrying spaced sprockets around which the last mentioned chain runs and a spring mechanism tending to swing said rocker.

15. In an industrial truck, the combination of a frame having supporting wheels at its front and rear ends, a vertical guide on said frame disposed in a transverse plane inwardly of the axle for said front wheels and extending downwardly below the front wheel axle, a slide member mounted on said guide and having spaced parallel plates extending outwardly beyond the front wheel axle, said plates being cut away to receive the axle when said member is lowered, and a carrier on the outer ends of said plates.

16. In an industrial truck, the combination of a wheel mounted frame, a substantially vertical guide thereon, an elevator comprising a member slidable on said guide and a load carrier pivoted on said member to tilt inwardly and outwardly, a pair of sprockets connected together and rotatably mounted on said slide member, a chain connected to said carrier at one end and adapted to wind on and off one of said sprockets, a power mechanism, a sprocket driven by said mechanism, a chain having its intermediate portion in engagement with said driven sprocket, one end portion of said last mentioned chain being arranged to wind on and off the other of said connected sprockets and operable when unwinding therefrom, due to operation of said power mechanism, to wind the other chain on its sprocket, whereby said carrier is tilted inwardly, and the other end portion of the last mentioned chain being connected to said slide member, and means for taking up slack in said last mentioned chain.

17. In an industrial truck, the combination of a wheel mounted frame, a substantially vertical guide thereon, an elevator comprising a member slidable on said guide and a load carrier pivoted on said member to tilt inwardly and outwardly, a pair of sprockets connected together and rotatably mounted on said slide member, a chain connected to said carrier at one end and adapted to wind on and off one of said sprockets, a power mechanism, a sprocket driven by said mechanism, a chain having its intermediate portion in engaging relation with said driven sprocket, one end portion of said last mentioned chain being arranged to wind on and off the other of said connected sprockets and operable when unwinding therefrom, due to operation of said power mechanism, to wind the other chain on its sprocket, whereby said carrier is tilted inwardly, and the other end portion of the last mentioned chain being connected to said slide member, and means engaging the last mentioned end portion of said chain for compensating for that portion unwound from its sprocket.

18. In an industrial truck, the combination of a wheel mounted frame, a substantially vertical guide thereon, an elevator comprising a member slidable on said guide and a load carrier pivoted on said member to tilt inwardly and outwardly, a pair of sprockets connected together and rotatably mounted on said slide member, a chain connected to said carrier at one end and adapted to wind on and off one of said sprockets, a power mechanism, a sprocket driven by said mechanism, a chain having its intermediate portion in engaging relation with said driven sprocket, one end portion of said last mentioned chain being arranged to wind on and off the other of said connected sprockets and operable when unwinding therefrom, due to operation of said power mechanism, to wind the other chain on its sprocket, whereby said carrier is tilted inwardly, and the other end portion of the last mentioned chain being connected to said slide member, means engaging the last mentioned end portion of said chain for compensating for that portion unwound from its sprocket, and means for taking up slack in said last mentioned chain disposed between said driven sprocket and said pair of sprockets.

19. In an industrial truck, the combination of a wheel mounted frame, a guide, means for supporting said guide on said frame to swing inwardly and outwardly, means for swinging said guide, an elevator comprising a member slidable on said guide and a load carrier pivoted on said member to tilt inwardly and outwardly, and hoisting means on said frame for raising and lowering said elevator, said means including a flexible member operatively connected to said slide member and differentially connected to said load carrier at one end and directly connected at its opposite end to said slide member, said flexible member being arranged to tilt the carrier when said hoist means are operated.

EDWARD H. REMDE.